United States Patent
Eliasson

(10) Patent No.: US 8,577,499 B2
(45) Date of Patent: Nov. 5, 2013

(54) METHOD AND A DEVICE FOR OPTIMIZING A PROGRAMMED MOVEMENT PATH FOR AN INDUSTRIAL ROBOT

(75) Inventor: Per Emil Eliasson, Västerås (SE)

(73) Assignee: ABB Technology AB, Västerås (SE)

( * ) Notice: Subject to any disclaimer, the term of this patent is extended or adjusted under 35 U.S.C. 154(b) by 305 days.

(21) Appl. No.: 12/532,924

(22) PCT Filed: Nov. 19, 2008

(86) PCT No.: PCT/EP2008/065873
§ 371 (c)(1),
(2), (4) Date: Jan. 19, 2011

(87) PCT Pub. No.: WO2010/057528
PCT Pub. Date: May 27, 2010

(65) Prior Publication Data
US 2011/0106308 A1    May 5, 2011

(51) Int. Cl.
*G05B 19/18* (2006.01)
(52) U.S. Cl.
USPC .......................... 700/257; 700/250; 700/255
(58) Field of Classification Search
USPC ................ 700/245, 250, 252, 253, 255, 257; 901/9
See application file for complete search history.

(56) References Cited

U.S. PATENT DOCUMENTS

| 2004/0019407 A1 | 1/2004 | Greene et al. | |
| 2004/0111185 A1* | 6/2004 | Gmeiner | 700/245 |
| 2005/0143858 A1* | 6/2005 | Jerregard et al. | 700/245 |
| 2005/0246062 A1 | 11/2005 | Keibel | |
| 2007/0244599 A1 | 10/2007 | Tsai et al. | |
| 2008/0201015 A1* | 8/2008 | Brogardh | 700/254 |

FOREIGN PATENT DOCUMENTS

| WO | WO-2005/044522 A2 | 5/2005 |
| WO | WO-2005/124486 A2 | 12/2005 |

OTHER PUBLICATIONS

PCT/ISA/210—International Search Report—Aug. 24, 2009.
PCT/ISA/237—Written Opinion of the International Searching Authority—Aug. 24, 2009.

* cited by examiner

*Primary Examiner* — James Trammell
*Assistant Examiner* — Jerrah Edwards
(74) *Attorney, Agent, or Firm* — Venable LLP; Eric J. Franklin; Jeffri A. Kaminski

(57) ABSTRACT

A device and method for optimizing a programmed movement path for an industrial robot holding a tool to carry out work along the path during a work cycle. The movement path includes information on positions and orientations for the tool at a plurality of target points on the movement path. The method includes for at least one of the target points: receiving a tolerance interval for the orientation of the tool in the target point, determining movements of the robot between the target point and one or more of the other target points on the path for a plurality of different tool orientations within the tolerance interval, selecting one of the different tool orientations as the tool orientation for the target point based on the determined movements of the robot and with regard to minimizing cycle time, and generating a robot program based on the selected orientation of the tool at the target point.

14 Claims, 3 Drawing Sheets

US 8,577,499 B2

METHOD AND A DEVICE FOR OPTIMIZING A PROGRAMMED MOVEMENT PATH FOR AN INDUSTRIAL ROBOT

CROSS-REFERENCE TO RELATED APPLICATIONS

This application is the national phase under 35 U.S.C. §371 of PCT/EP2008/065873 filed 19 Nov. 2008.

FIELD OF THE INVENTION

The present invention relates to a device and a method for optimizing a programmed movement path for an industrial robot. The invention is suitable for any types of robot automated processes in which the tool orientation is of less importance, such as laser welding, laser cutting, water jet cutting, arc welding, and milling.

PRIOR ART

An industrial robot is generally used for industrial automation. The robot is programmed to follow a movement path while the robot carries out work during a work cycle. The robot program has information about what the robot should do and in which order tasks should be executed along the path. The robot program has information about all target points on the movement path. The robot programming could be done online manually by teaching the robot positions and orientations of target points on the movement path. The robot program could also be created by an offline programming and simulation tool running on an external computer, such as a PC. Typically, the robot target is a position target, which means that the target comprises a Cartesian value (x, y, z) defining the position of the tool and information about what orientation the tool should have at the target. The information on the tool orientation can be described in different forms, for example, as quartions, a rotation matrix, or as roll, pitch and yaw angles. If the target points are position targets it requires some calculations for transforming the position targets to joint values for the axes of the robot. This transformation is done by a kinematic model of the robot. In order to transform values from the Cartesian space to joint space inverse kinematics is used.

One important parameter for almost all robot applications is the cycle time. By cycle time is meant the time it takes for the robot to carry out a work cycle. It is important to make the robot program as optimized as possible in order to reduce the cycle time. Reduction of cycle time with preserved quality results in reduction of production cost.

OBJECTS AND SUMMARY OF THE INVENTION

The object of the present invention is to optimize a programmed movement path for an industrial robot in order to reduce the cycle time.

According to one aspect of the invention this object is achieved by a method.

Such a method comprises, for at least one of the target points, receiving a tolerance interval for the orientation of the tool in the target point, determining movements of the robot between the target point and one or more of the other target points on the path for a plurality of different tool orientations within the tolerance interval, selecting one of the different tool orientations as the tool orientation for the target point based on the determined movements of the robot and with regard to minimizing cycle time, and generating a robot program based on the selected orientation of the tool at the target point.

There are some robot applications where the orientation of the tool is of less importance, for example, water jet cutting and laser welding in thin materials. The tool orientation can be allowed to vary for the tilting of the tool as well as in the rotation around the symmetry axis of the tool. If the tool orientation is arbitrary for a specific target point on the path, or if it is allowed to vary the tool orientation within a tolerance interval, there is redundancy for the inverse kinematics. This means that there are several possible robot configurations that satisfy the given constraints, i.e. the given tool position and tolerance interval for the tool orientation. According to the invention, the tolerance of the tool angle is used for optimizing the robot movements in order to reduce the cycle time.

The tolerance interval is, for example, defined by an angle forming a cone around a programmed orientation of the tool or around a default tool orientation. The tolerance interval is, for example, chosen by the robot programmer and may vary from an arbitrary orientation of the tool to only allow a small tilt of the tool. The invention makes it possible to have the same tolerance interval for all target points on the movement path, or to have different tolerance intervals for different target points on the movement path. The latter alternative is suitable if the tool orientations are of less importance at certain parts of the movement path, and of high importance on other parts of the movement path. It is also possible to set the tolerance interval to zero for one or more of the target points on parts of the path at which an exact orientation is of high importance.

The optimization can be performed for some of the programmed target points, or for all target points on the path. For each target point to be optimized, the movements of the robot is determined for a plurality of different tool orientations within the give tolerance interval, and the optimal orientation for the tool in the target point is selected among the different tool orientations with regard to minimizing the cycle time. When optimal orientations of the tool have been determined for the target points, a robot program is generated based on the programmed tool positions and the determined optimal tool orientations. If the tool orientation is not optimized for some of the targets, the robot program is generated based on the programmed tool orientations.

The invention can be used on on-line as well as off-line programmed target points. However, the invention is particularly advantageous for off-line programmed target points since the optimization of the tool orientation can be made using the same computer and the same simulation tool as used for programming the target points. Preferably, the optimization algorithm of the invention is run in immediate connection to the off-line programming of the target points.

If the method according to the invention is used during off-line programming of the robot the optimization could be done when all, or a subset of the Cartesian target points are defined. The optimization could be done on an external computer, such as a PC, or directly on the robot controller.

According to an embodiment of the invention, the method comprises determining the time it takes for the robot to move between the target points for the different tool orientations based on the determined movements of the robot, and the tool orientation in the target point is selected with regard to minimizing the time it takes for the robot to move between the target points. For example, the time it takes for the robot to move between the target points for the different tool orientations is determined by simulating the movement path based on a kinematic and a dynamic model of the robot. The cycle time is determined by the time it takes for the robot to move between all target points on the path. By reducing the time it takes for the robot to move between one or more of the target points, the cycle time is correspondingly reduced. This embodiment makes it possible to carry out an accurate optimization of the tool orientation considering the achieved reduction of the cycle time.

According to an embodiment of the invention, the simulation is performed by means of a path interpolator, which is a copy of the path interpolator of the robot. This embodiment achieves a true simulation of the robot, and accordingly an accurate optimization of the path with regard to cycle time.

According to an embodiment of the invention, the movements of the robot are determined by calculating the movements of the axes of the robot for the different tool orientations, and the tool orientation is selected with regard to the orientation that minimizes the movement of at least one of the axes of the robot. In order to reduce the cycle time, the axis is selected as an axis with poor performance compared to the performance of the other axes of the robot. The selected axis can be a linear or a rotation axis. The movements of the axes of the robot is calculated by converting the position and orientation of the tool at the target point into positions of the axes of the robot based on a kinematic model of the robot. Commonly, the performance of different axes of the robot varies. Thus, in order to reduce the cycle time, axes with poor performance should be moved as little as possible. According to this embodiment of the invention, the cycle time is reduced by selecting tool orientations that minimized the movements of axes with poor performance. This embodiment is particularly useful for robot types with big differences in performance of different axes. An advantage with this embodiment is that it is fast since it does not require looking at the dynamic performance of the robot axes.

According to an embodiment of the invention, the robot comprises a base arranged to be attached to the ground, a first arm arranged movable relative the base about a first axis, a second arm arranged movable relative the first arm about a second axis, and a third arm arranged rotatably movable relative the second arm about a third axis, and the optimal orientations of the tool in the target points are determined as the orientations that minimize the movements of any of or any combination of the first, second and third axes of the robot. For example, if the robot is a six-axis robot, commonly the first, the second and the third axes of the robot have a poorer performance than the other axes of the robot. Accordingly, it is advantageous to perform the optimization by minimizing the movements of any of or all of the first, the second and the third axes of a robot.

According to another aspect of the invention, the object is achieved by a device for optimizing a programmed movement path.

Such a device comprises: a data storage configured to store tolerance intervals for the orientation of the tool at the target points on the movement path, a computing unit configured to determine movements of the robot between target points on the path for a plurality of different tool orientations within the tolerance intervals, and to select tool orientations for the target point based on the determined movements of the robot with regard to minimizing cycle time, and a robot program generator configured to generate a robot program based on the positions and selected orientations of the tool at the target points.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
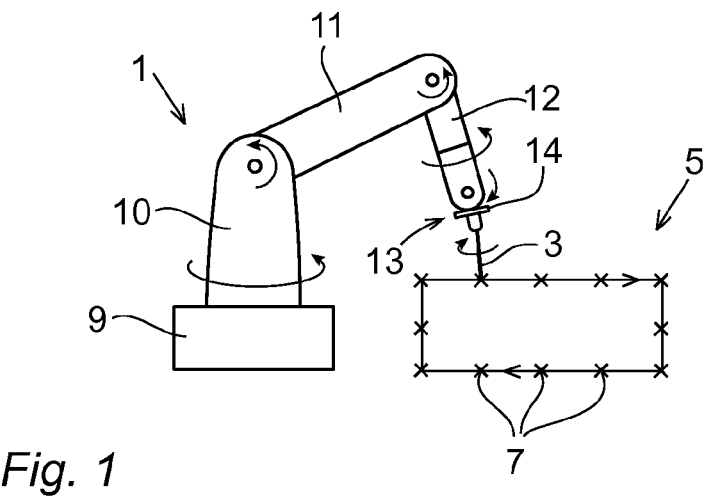
FIG. 1 shows an example of an industrial robot holding a tool carrying out work along a movement path.

FIG. 1 shows an example of an industrial robot 1 holding a tool 3 and carrying out work along a movement path 5 including a plurality of programmed target points 7. The target points can be programmed on-line by teaching the robot the target points or off-line using an off-line programming and simulation tool. The robot program includes information on the positions and orientations of the tool in the target points. The robot 1 is a typical six-axis robot and comprises a base 9 arranged to be attached to the ground. The ground is, for example, a floor, a wall, or a roof of a building. The robot further comprises a first arm 10, which is rotatable relative to the base 9 around a first axis. In the top end of the first arm 10, a second robot arm 11 is mounted rotatable relative to the first arm about a second axis. In the outer end of the second arm 11, a third arm 12 is mounted rotatable relative to the second arm about a third axis. In this example, the third arm 11 comprises two parts and the outer part is rotatable relative to the inner part about a fourth axis. The third arm 12 supports in its outer end a so-called robot hand 13, which is rotatable around a fifth axis. The robot also comprises a tool attachment, which is rotatable relative to the robot hand about a sixth axis. For this type of robot, the performance of the first, second and third axes are poorer than for the other axes. In particular, movements about the first axis should be avoided due to poor performance of the first axis.

Figure 2:
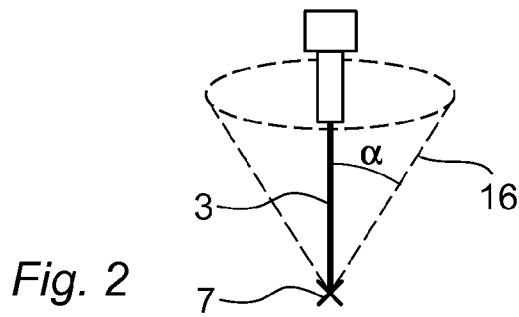
FIG. 2 shows an example of a tolerance interval for the orientation of the tool in a target point.

In some applications the orientation of the tool is not important. For example, the angle of the tool 3 with respect to a target point 7 can be varied within a cone 16 around the tool as shown in FIG. 2. The angle α of the cone defines a tolerance interval for the orientation of the tool in the target point. Further in many applications, such as laser jet cutting and laser welding, the rotation of the tool about its symmetrical axis can be arbitrary. According to the invention, the robot path is optimized by optimizing the orientation of the tool within a given tolerance interval. The optimization is made with regard to minimizing the cycle time and thereby to reduce production cost.

Figure 3:
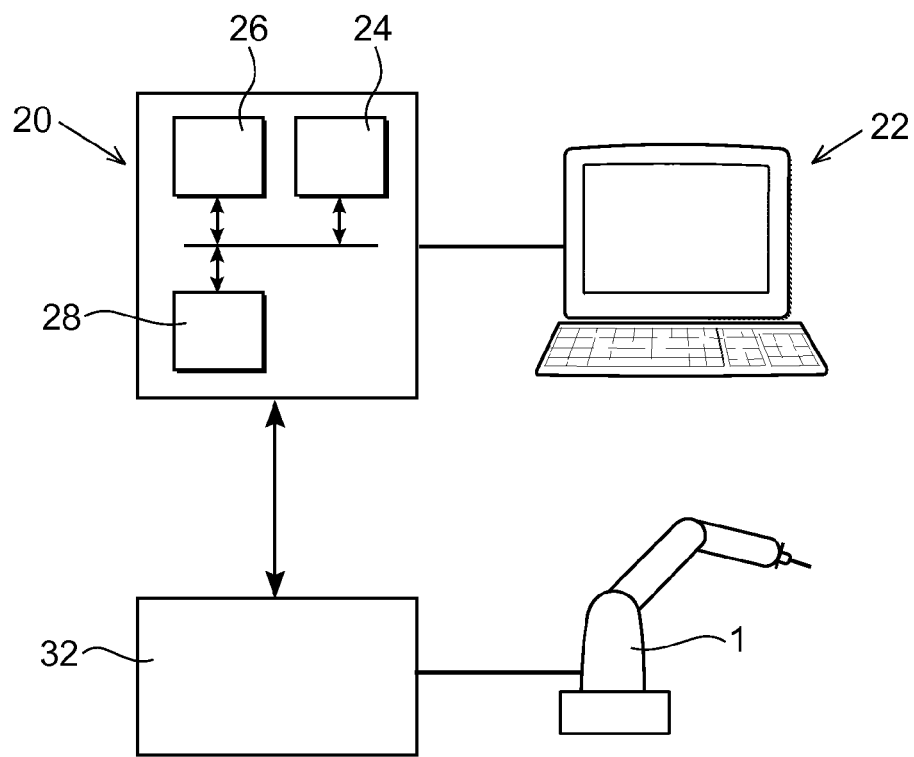
FIG. 3 shows a device for optimizing a programmed movement path according to an embodiment of the invention.
Figure 4:
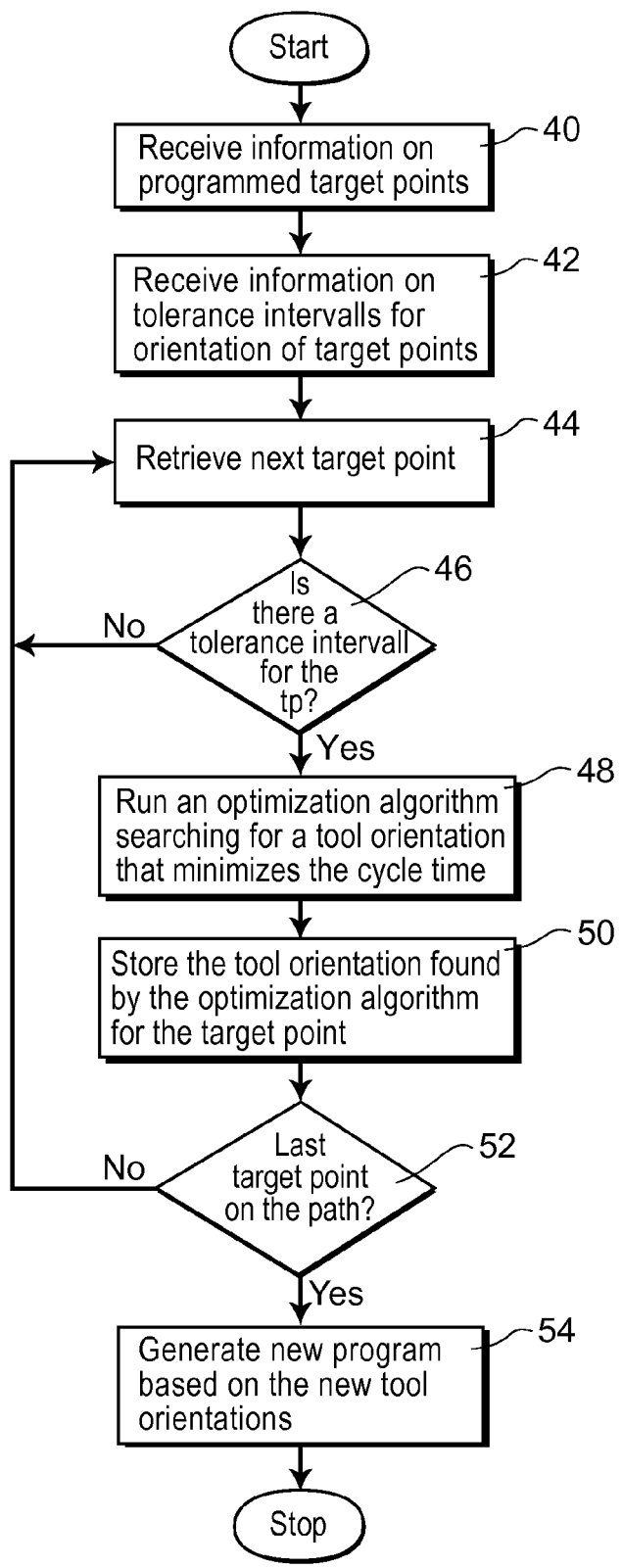
FIG. 4 shows a flow diagram of a method according to an embodiment of the invention.

FIG. 3 shows a device 20 for optimizing a programmed movement path according to an embodiment of the invention. The device 20 is a computer, for example a PC, including a user interface 22, such as a display screen, a keyboard and a mouth. The device 20 comprises hardware necessary for processing data such as a central processing unit (CPU), data storage, and communication means for communicating with external equipment, for example with a robot controller. The device 20 also comprises software for carrying out the method according to the invention. The device 20 comprises a computing unit 24 configured to receive tolerance intervals for the orientation of the tool at target points on the programmed movement path. The tolerance intervals are, for example, input by a user through the user interface 22. The device 20 also comprises data storage 26 for storing a programmed movement path including information on tool positions and tool orientations a at the target points of the path. The computing unit 24 is also configured to store received tolerance intervals for the target points in the data storage 26.

The computing unit 24 is further configured to determine movements of the robot between the target points on the programmed path for a plurality of different tool orientations within the received tool intervals, and to select new tool orientations for the target points based on the determined movements of the robot with regard to minimizing cycle time. Preferably, the computing unit includes an optimization algorithm which is configured to search for optimal orientations of the tool within the tolerance interval at the target points with regard to minimize the cycle time. The device 20 also comprises a robot program generator 28 configured to generate a new robot program based on the programmed tool positions in the target points, and the new optimized tool orientations at the target points.

It is advantageous if an off-line programming and simulation tool is provided on the same computer as the optimizing device 20. In this case the robot programmer creates a robot program using the off-line programming and simulation tool 30. The programmed target points are stored in the data storage 26. Thereafter, the optimization of the tool orientation is started by initiating the computing unit 24. During the optimization the new tool orientations are stored in the data storage 26. When the computing unit 24 has finished the optimization, the program generator 28 generates a new robot program based on the new optimized orientations at the target points. The optimized robot program is transferred to a robot controller 32, which downloads the optimized robot program. Then, the robot system is ready for running the optimized robot program. The optimization could be done when all target points have been programmed as described above, or when a subset of the target points has been programmed.

FIG. 3 shows a flow diagram of the method according to an embodiment of the present invention. It will be understood that each block of the flow diagram can be implemented by computer program instructions.

Information on programmed target points is received, block 40. The target points are, for example, retrieved from the data storage 26. The information includes programmed Cartesian tool positions and tool orientations for the target points on the path. The user inputs information on tolerance intervals for tool orientations at the target points, block 42. The user may input one tolerance interval for all the target points on the path, or different tolerance intervals for different points of the path. The user does not have to input tolerance intervals for all target points on the path. For some of target points the tool orientations may be fixed and therefore cannot not be varied. For those target points, the programmed tool orientations are kept and no optimization is performed.

The method steps through each target point on the path, block 44. For each target point it is decided whether there is a tolerance interval for the target point or not, block 46. If the tolerance interval is zero, it is the same as if there is no tolerance interval for the target point. If there is no tolerance interval for the target point, the next target point on the path is retrieved, block 44. If there is a tolerance interval for the target point an optimization algorithm is run searching for a tool orientation that minimizes the cycle time, block 48. For each target point to be optimized it is necessary to retrieve information on programmed tool positions, tool orientations, and tool tolerance intervals for at least the target point, the previous target point on the path, and the next target point on the path. The constraints to the optimization algorithm are the positions of the target point and surrounding target points, and the tolerance interval around the programmed orientation.

The optimization can be executed in different ways. In the following, two examples of the optimization will be described. A first way to perform the optimization is to find a tool orientation that minimizes the time it takes for the robot to move between two or more target points. A second way to perform the optimization is to find a tool orientation which minimizes the movements of some predefined axes of the robot when the robot moves between two or more target points.

The first optimization procedure carries out a search with regard to the full dynamic and kinematic properties of the robot. The optimization is carried out by using a dynamic and a kinematic model of the robot and a copy of the path interpolator used by the robot controller. The path interpolator determines how the programmed movement should be performed by carrying out an interpolation of the movement. The interpolation includes dividing the programmed movement into a plurality of small increments, and computing the angles for all axes of the robot for each increment. The robot path is simulated based on the dynamic and kinematic models of the robot and by means of a copy of the path interpolator of the robot controller. The optimization problem to be solved is to minimize the time for a specific motion, i.e. the time it takes to move the robot between two or more target points, with well defined constraints. The constraints are the programmed Cartesian positions for the target points, the programmed tool orientation, and the tolerance interval for the tool orientation. A large number of simulations have to be made to find the tool orientation within the tolerance interval that minimize the cycle time for the path. To reduce the time for carrying out the optimization, good initial guesses can be done automatically when starting the optimization algorithm. The initial guesses will be based on the order of the robot targets and their respective Cartesian position and the programmed tool orientation.

The second way to carry out the optimization does not consider the dynamic performance of the robot axes. No simulations are needed. Only the static joint solution at each target point is considered. The search problem is to minimize the movement of one or more predefined axis. Normally this should be the axes with most poor performance. The constraints to the optimization algorithm are the programmed Cartesian positions for the target points and their programmed tool orientation and the tolerance interval. This method calculates the movements of the axes of the robot for different tool orientations based on a kinematic model of the robot. Outputs from the optimization are the Cartesian tool position in the target point and the optimized tool orientation in the target point. The optimization uses the kinematic model to find the axes configurations for each target point with tolerances that minimizes the movements for the predefined axes between two or more target points. Initial guesses could be done in the same way as for the first way.

The use of dynamic and kinematic models of a robot is well known in the art, and is, for example, described in a book with the title "Introduction to robotics mechanics and control" by John J. Craig, 2005, ISBN 0-13-123629-6.

Both optimization procedures described above could be performed by testing a number of possible solutions. The chosen solution is the one that is best according to what should be optimized, i.e. time or movement of predefined axes. This way of doing the optimization could be very time-consuming if the search resolution should be high. There are many known optimization methods that could be used for finding optimum for this kind of problem, for example a gradient-based optimization method.

The found optimized tool orientation is stored as the tool orientation for the target point, block 50. The steps 44-52 of the method are repeated for each target point on the path. When all points on the target have been looped through a new robot program is generated based on the Cartesian positions of the target points and the new optimized tool orientations for the target points for which a tolerance interval has been given, block 54. For the target points which have not received a tolerance interval the originally programmed tool orientations are kept and the new robot program is generated based on the originally programmed tool orientations for those target points.

The method according to the invention could be carried out on an external computer, such as a PC, or directly in the robot controller.

Figure 5:
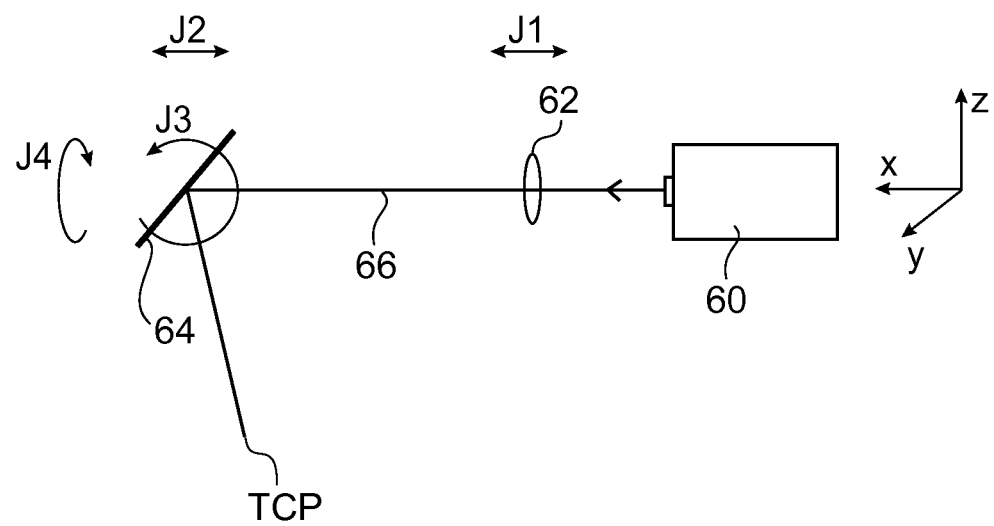
FIG. 5 shows a welding system using an industrial robot suitable to be optimized by the invention.

FIG. 5 shows a robot welding system having four axes on which the method according to the invention advantageously can be used. The kinematics described with reference to FIG. 5 could be used for welding as well as cutting with laser. The system shown in FIG. 5 comprises a laser 60, a lens 62, and a mirror 64. A laser beam 66 is going through the lens 62 and is reflected in the mirror 64. A coordinate system x,y,z is defined with respect to the laser beam 66. The x-axis of the coordinate system coincidence with the laser beam 66 generated by the laser. The first axis J1 of the robot system provides a linear motion of the lens 62 along the x-direction of the coordinate system. The second axis J2 provides a linear motion of the mirror in the x-direction. The third axis J3 provides a rotational movement of the mirror 64 around the y-direction of the coordinate system. A fourth axis J4 provides rotation of the mirror 64 around the x-direction of the coordinate system. The focus point of the laser beam is working as a tool centre point (TCP) with a system setup as shown in FIG. 5.

The performance of the axis J2 is poor compared to the other three axes J1, J3-J4. It is possible to reach an arbitrary Cartesian point in a limited volume around the mirror without moving the axis J2, as long as the orientation is of no importance. If a target point has a definite position and orientation all axes must be involved. The problem of the optimization is then to minimize the movements of the axis J2, while moving between all desired target points.

Another example of an application suitable for using the method according to the invention is a robot working with a positioner. A robot positioner is normally used for holding an object that a robot is working with. The positioner facilitates for the robot to reach the object from different directions. The positioner could have one or more axes. If the tool orientation for the robot is arbitrary, or arbitrary within a specified limit, the axes of the positioner could also be involved in the optimization of the resulting orientation.

The invention claimed is:

1. A method for optimizing a programmed movement path for an industrial robot holding a tool to carry out work along the path during a work cycle, the robot is movable about a plurality of axes, wherein the programmed movement path comprises information on positions and orientations for the tool at a plurality of target points on the programmed movement path, and the method comprising for at least one of the target points:
receiving a tolerance interval for the orientation of the tool in the target point with a computing unit,
determining movements with the computing unit, of the axes of the robot for moving the tool between the target point and one or more of the other target points on the path for a plurality of different tool orientations within the tolerance interval, wherein the determining movements of the axes of the robot includes converting the position and orientation of the tool at the target point into positions of the axes of the robot,
selecting with the computing unit, one of the different tool orientations as the tool orientation for the target point based on the determined movements of the axes of the robot and with regard to minimizing work cycle time, and
generating a robot program based on the selected orientation of the tool at the target point.

2. The method according to claim 1, further comprising:
determining the time required for the robot to move between the target points for the different tool orientations based on the determined movements of the robot, and
selecting the tool orientation in the target point with regard to minimizing the time required for the robot to move between the target points.

3. The method according to claim 2, wherein the time required for the robot to move between the target points for the different tool orientations is determined by simulating the programmed movement path based on a kinematic and a dynamic model of the robot.

4. The method according to claim 3, wherein said simulation is performed utilizing a path interpolator, which is a copy of a path interpolator of the robot.

5. The method according to claim 1, wherein the robot is movable about a plurality of axes, the movements of the robot is determined by calculating the movements of the axes of the robot for the different tool orientations, at least one of the axes of the robot is selected, and the tool orientation is selected with regard to the tool orientation that minimizes the movement of the selected axis.

6. The method according to claim 5, wherein said selected axis is selected as an axis with poor performance compared to the performance of the other axes of the robot.

7. The method according to claim 5, wherein calculating the movements of the axes of the robot comprises converting the position and orientation of the tool at the target point into positions of the axes of the robot based on a kinematic model of the robot.

8. The method according to claim 5, wherein the robot comprises a base arranged to be attached to the ground, a first arm arranged movable relative the base about a first axis, a second arm arranged movable relative the first arm about a second axis, and a third arm arranged rotatable movable relative the second arm about a third axis, the method further comprising:
determining the optimal orientations of the tool in the target points as the orientations which minimizes the movements of any of or any combination of the first, second and third axes of the robot.

9. A device for optimizing a programmed movement path for an industrial robot holding a tool to carry out work along the path during a work cycle, and the robot is movable about a plurality of axes, wherein the programmed movement path comprises information on positions and orientations for the tool at a plurality of target points on the programmed movement path, the device comprising:
a data storage configured to store tolerance intervals for the orientation of the tool at the target points on the programmed movement path,
a user interface configured to receive tolerance intervals for the orientation of the tool in the target points and to store the tolerance intervals in the data storage, a computing unit configured to determine movements of the robot between target points on the path for a plurality of different tool orientations within said tolerance intervals, wherein determining the movements of the axes of the robot includes converting the position and orientation of the tool at the target point into positions of the axes of the robot, and to select tool orientations for the target point based on the determined movements of the robot with regard to minimizing work cycle time, and a robot program generator configured to generate a robot program based on the positions and selected orientations of the tool at the target points.

10. The device according to claim 9, wherein the computing unit is configured to determine the time required for the robot to move between target points on the path for different tool orientations based on the determined movements of the robot, and to select tool orientations at the target points with regard to minimizing the time it takes for the robot to move between the target points.

11. The device according to claim 10, wherein the computing unit is configured to simulate the robot path based on a kinematic and a dynamic model of the robot, and wherein the computing unit is configured to determine the time required for the robot to move between target points on the path for the different tool orientations based on a simulated robot path.

12. The device according to claim 9, wherein the robot is movable about a plurality of axes, and wherein the computing unit is configured to calculate the movements of the axes of the robot for the different tool orientations, and to select tool orientations with regard to the orientation that minimizes the movement of at least one of the axes of the robot.

13. The device according to claim 12, wherein said at least one axis has poor performance compared to the performance of the other axes of the robot.

14. The device according to claim 12, wherein the computing unit is configured to convert the position and orientation of the tool at the target point into positions of the axes of the robot based on a kinematic model of the robot.

* * * * *